United States Patent [19]
Xie et al.

[11] Patent Number: 5,887,059
[45] Date of Patent: Mar. 23, 1999

[54] SYSTEM AND METHOD FOR PERFORMING ECHO CANCELLATION IN A COMMUNICATIONS NETWORK EMPLOYING A MIXED MODE LMS ADAPTIVE BALANCE FILTER

[75] Inventors: Zheng-yi Xie, Richardson; John G. Bartkowiak, Austin, both of Tex.

[73] Assignee: Advanced Micro Devices, Inc., Sunnyvale, Calif.

[21] Appl. No.: 594,018

[22] Filed: Jan. 30, 1996

[51] Int. Cl.$^6$ .................................................. H04M 9/08
[52] U.S. Cl. .......................... 379/410; 379/402; 379/406; 379/411
[58] Field of Search .................................... 379/410, 411, 379/406, 407, 408, 402, 345; 370/32.1; 364/724.01

[56] References Cited

U.S. PATENT DOCUMENTS

| | | | |
|---|---|---|---|
| 4,539,675 | 9/1985 | Fisher | 379/410 |
| 4,972,467 | 11/1990 | Nakagawa et al. | 379/411 |
| 5,062,102 | 10/1991 | Taguchi et al. | 379/410 |
| 5,313,498 | 5/1994 | Sano | 379/410 |
| 5,502,717 | 3/1996 | Park | 379/410 |
| 5,546,459 | 8/1996 | Sih et al. | 379/410 |

FOREIGN PATENT DOCUMENTS 0 530 423  3/1993  European Pat. Off. .

OTHER PUBLICATIONS

Dasgupta, S. et al., "Sign–sign LMS Convergence With Independent Stochastic Inputs," IEEE Transactions on Information Theory, Jan. 1990, USA, vol. 36, No. 1, ISSN 0018–9448, pp. 197–201.

Rongt–Yih, Chen et al., "On the Optimum Step Size for the Adaptive Sign and LMS Algorithms," IEEE Transactions on Circuits and Systems, vol. 37, No. 6, Jun. 1, 1990, pp. 836–840.

International Search Report for PCT/US 97/00676 mailed Jun. 4, 1997.

John Bellamy, "Digital Telephony, Second Edition," A Wiley–Interscience Publication, John Wiley & Sons, Inc., 7 pages. Jun. 1981.

Theo A.C.M. Claasen and Wolfgang F.G. Mecklenbräuker, "Comparison of the Convergence of Two Algorithms for Adaptive FIR Digital Filters," IEEE Transactions on Acoustics, Speech, and Signal Processing, vol. ASSP–29, No. 3, Jun. 1981, 9 pages.

Bernard Widrow, "Adaptive Filters," Aspects of Network and System Theory, 1971, 15 pages.

"Adaptive Filter Theory," Simon Haykin Prentice Hall, 1991, pp. 299–399.

*Primary Examiner*—Harry S. Hong
*Assistant Examiner*—Jacques M. Saint-Surin
*Attorney, Agent, or Firm*—Conley, Rose & Tayon; Jeffrey C. Hood; E. Alan Davis

[57] ABSTRACT

A system and method for performing echo cancellation in a communications network including a bi-directional two-wire communication line, and a four-wire communication line having a transmit path and a receive path. The system includes a filter coupled to the receive path for reducing the echo component. The filter uses a number of filter coefficients and selectively employs either a full LMS coefficient calculation technique to compute the filter coefficients during a first period of time to achieve quick convergence, or a sign-sign LMS coefficient calculation technique to compute the filter coefficients during a second period of time to achieve improved stability and convergence. The filter uses a power estimation of the transmit path signal to direct the filter as to which coefficient calculation technique to use. The filter controller also includes a counter for determining an amount of time passed since the establishment of a connection, and this information is also used to determine the coefficient calculation technique. The filter generates an echo estimate signal which it subtracts from the received signal to generate an echo canceled signal, also known as an error signal. The filter uses three different step sizes when computing the filter coefficients to selectively achieve quick convergence or greater echo cancellation accuracy.

35 Claims, 14 Drawing Sheets

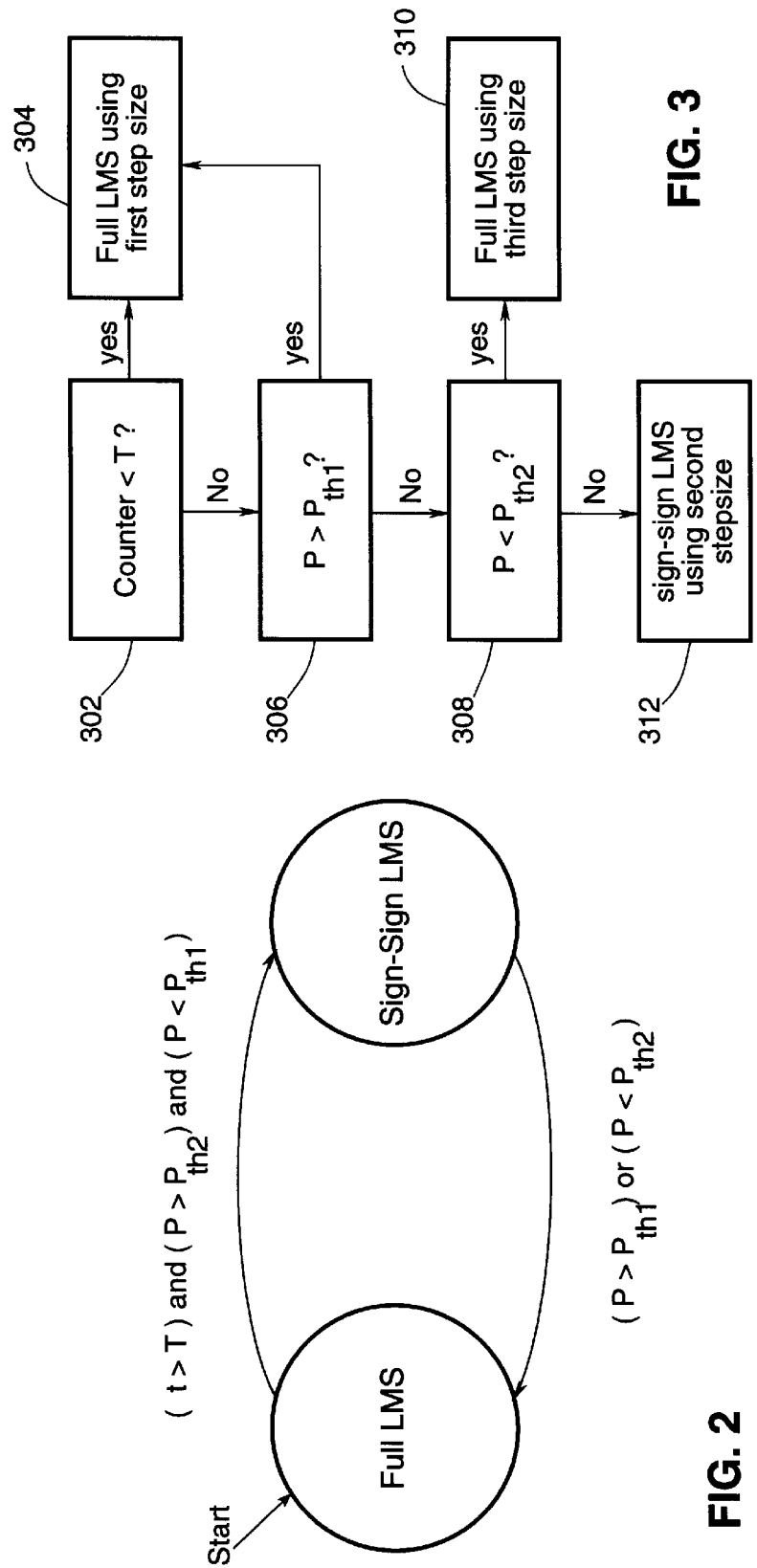

SYSTEM AND METHOD FOR PERFORMING ECHO CANCELLATION IN A COMMUNICATIONS NETWORK EMPLOYING A MIXED MODE LMS ADAPTIVE BALANCE FILTER

BACKGROUND OF THE INVENTION

1. Field of the Invention

This invention is related to the field of echo cancellation in communication networks employing hybrid transformers, and more particularly to an echo cancellation system that uses a mixed mode Least Mean Square (LMS) adaptive balance filter system which improves echo cancellation performance.

2. Description of the Relevant Art

Telephone networks commonly employ two-wire bi-directional communication lines which connect a subscriber, such as a telephone set in a home or office, to the network central office. In general, two-wire bi-directional communication lines are used in the subscriber loop for reduced cost. However, other communication paths in the telephone network, such as trunks between central offices, use four-wire communication lines. Four-wire communication lines have separate transmit and receive paths and provide better transmission quality due to the fact that each path may be separately optimized. Another advantage of four-wire lines is that communication techniques such as frequency division multiplexing (FDM), which require separate transmit and receive paths, may be employed. Hence, a means is necessary to convert two-wire bi-directional signals to separate transmit and receive signals on a four-wire communication line.

Central office line controller circuits frequently use Hybrid transformers to provide two wire to four wire circuit conversion. Hybrid transformers are also widely used in digital terminal equipment such as digital cordless telephone base stations, digital telephone answering devices, etc.

With the use of a hybrid transformer, four-wire communication lines may be used in most of the telephone network, providing increased transmission quality while less expensive two-wire lines may be used in the subscriber loop. However, the problem of impedance mismatch is introduced at the two wire to four wire conversion point, namely at the hybrid. This impedance mismatch results in the transmit path signal reflecting back to the receive path at the conversion point, which is commonly referred to as "echo". The amount of echo a hybrid generates depends on the quality of the hybrid to separate the receive and transmit paths and the line load condition. On a heavily loaded long loop, the echo effect will be larger. Typical echo is about 10 to 16 dB below the source signal without an echo canceller. This results in a very annoying effect if the echo is strong and has a long delay, such as 30 milliseconds or more. Possibly worse, in some cases, the echo can cause telephony equipment to malfunction. This is a common problem on full-duplex modems, DTMF detectors on telephone answering machines, and other such devices. Hence, echo cancellation is commonly used in such circuits to reduce echo problems.

Another situation which makes echo cancellation difficult is what is commonly referred to as "double-talker". Double-talker occurs where the communication line is transmitting and receiving simultaneously. By way of example, consider a digital telephone answering machine with a dual-tone multifrequency (DTMF) detector. An answering machine typically includes a DTMF detector to enable a person to control his answering machine locally or from a remote telephone keypad using DTMF tones, i.e. touch 2 for forward, 3 for rewind, 4 for stop, and 5 to leave a memo, etc. When the answering machine is in play back mode, the played speech on the transmit path echoes back to the receive path. If the user at a remote telephone is also entering DTMF commands, this may cause the DTMF detector to not be able to detect the remote DTMF commands. In other words, if speech is being played, such as the answering machine greeting or a recorded message, and is echoed back to the answer machine, and if the DTMF detector is receiving tones, the DTMF detector may have difficulty detecting the DTMF signals which are mixed with the presence of speech. As a result, the answering machine may miss the command. Hence, employment of an echo canceller in this case would be useful.

Another situation where echo can be harmful is when a subscriber device, such as an answering machine, generates a DTMF signal, and the signal reflects back at the hybrid and causes a false detection by the DTMF detector. It is readily apparent that an echo canceller will help in this situation.

Prior art echo cancellation methods include measuring the impulse response of the hybrid and then constructing a balancing filter that has the same characteristics as the hybrid. The filter receives the transmit path signal and generates an estimate of the echo. On the receive path, the echo estimate is subtracted from the actual received signal. The result is the echo canceled transmit signal.

If the line or transmission condition never changes and the response of the hybrid can be easily and accurately measured, a balancing filter echo canceller with fixed characteristics works sufficiently. Unfortunately, in a real-world telephone network, the line and transmission conditions constantly change. With these changes, it is essential to adaptively change the characteristics of the filter, namely the filter coefficients, quickly so that the echo cancellation is timely and accurate. An adaptive balance filter updates its coefficients based on the transmit path signal and the error signal. The error signal is the difference between the actual received signal and the echo estimate.

Often echo canceling balance filters are implemented as digital signal processors which adaptively compute the coefficients of the filter. One of the popular methods to compute filter coefficients are the least mean square (LMS) methods because of their low computational complexity and good stability if designed properly. LMS algorithms can be further classified as full LMS, sign-sign, sign-error, leaky LMS, normalized LMS, etc. Each version has its advantages and disadvantages.

A few criteria are commonly used in evaluating the quality of an echo canceller. The first is the speed of convergence, including the speed of initial convergence and the speed to regain convergence when the line condition changes. This is especially important in the case of an echo canceller designed as part of a DTMF detector because when a connection is established on the line, a DTMF signal can be immediately generated. Also, a valid DTMF signal can be as short as 40 milliseconds or less, depending upon the telephony standards of the particular country of interest.

In addition to the convergence time, another criteria used to evaluate an echo canceller is accuracy, which is the amount of echo cancellation. The following equation measures the echo cancellation:

$$\text{cancellation result} = \sum_{n=0}^{N-1} x^2(n) / \sum_{n=0}^{N-1} e^2(n)$$

In the above equation, x(n) is the transmit path signal, e(n) is the error signal, n is a sample index and N is the measurement frame size. The larger the cancellation result, the better the echo cancellation which the echo canceller achieves. In some telecommunications applications, a minimum cancellation result is required. For example, the DECT standard requires at least 24 dB cancellation at the near-end. Clearly, the goal is to design an echo canceller that converges fast, and cancels echo well.

A third echo canceller criteria is the ability to handle the double talker situation described previously. In this case, the received signal is the sum of the echo plus the far-end signal. The goal is to cancel out the echo as much as possible while minimizing the distortion to the far-end signal.

Finally, a fourth criteria is the complexity of the method used to calculate the filter coefficients. A simple but effective solution saves DSP code space and processing power, and is very much related to the cost of the product.

Hence, it is readily observed that an improved system and method is desired which performs echo cancellation in a communications channel in which a hybrid transformer performs two-wire to four-wire conversion.

SUMMARY OF THE INVENTION

The present invention comprises a system and method for performing echo cancellation in a communications network including a bi-directional two-wire communication line and a four-wire communication line having a transmit path and a receive path. The transmit path is adapted to transfer a transmit path signal and the receive path is adapted to receive a received signal. The system further includes a hybrid transformer coupled between the two communication lines which performs two-wire to four-wire circuit conversion on signals transmitted between the two communication lines. When the transmit path signal is transmitted an echo component is reflected from the transformer to the receive path.

The system of the present invention includes a filter coupled to the receive path for reducing the echo component. The filter uses a number of filter coefficients and selectively employs either a full LMS coefficient calculation technique to compute the filter coefficients during a first period of time to achieve quick convergence, or a sign-sign LMS coefficient calculation technique to compute the filter coefficients during a second period of time to achieve improved stability and convergence. The filter generates an echo estimate signal which is subtracted from the received signal to generate an echo canceled signal, also known as an error signal. The filter preferably uses three different step sizes when computing the filter coefficients to achieve quicker convergence or greater echo cancellation accuracy.

The system further includes a filter controller which generates a power estimation of the transmit path signal. The filter controller uses the power estimation to direct the filter to use a respective coefficient calculation technique. The filter controller also includes a counter for determining an amount of time passed since the establishment of a connection. This amount of time is also used in determining which coefficient calculation technique to use.

Therefore, the present invention comprises an echo cancellation system and method with improved echo cancellation performance. The present invention selectively employs different coefficient calculation techniques based on information about the transmitted signal.

BRIEF DESCRIPTION OF THE DRAWINGS

Other objects and advantages of the invention will become apparent upon reading the following detailed description and upon reference to the accompanying drawings in which:

FIG. 2 is a state diagram illustrating a method for choosing the filter coefficient update technique according to the preferred embodiment;

FIG. 3 is a flow diagram illustrating a method for choosing the filter coefficient update technique according to the preferred embodiment;

Figure 1:
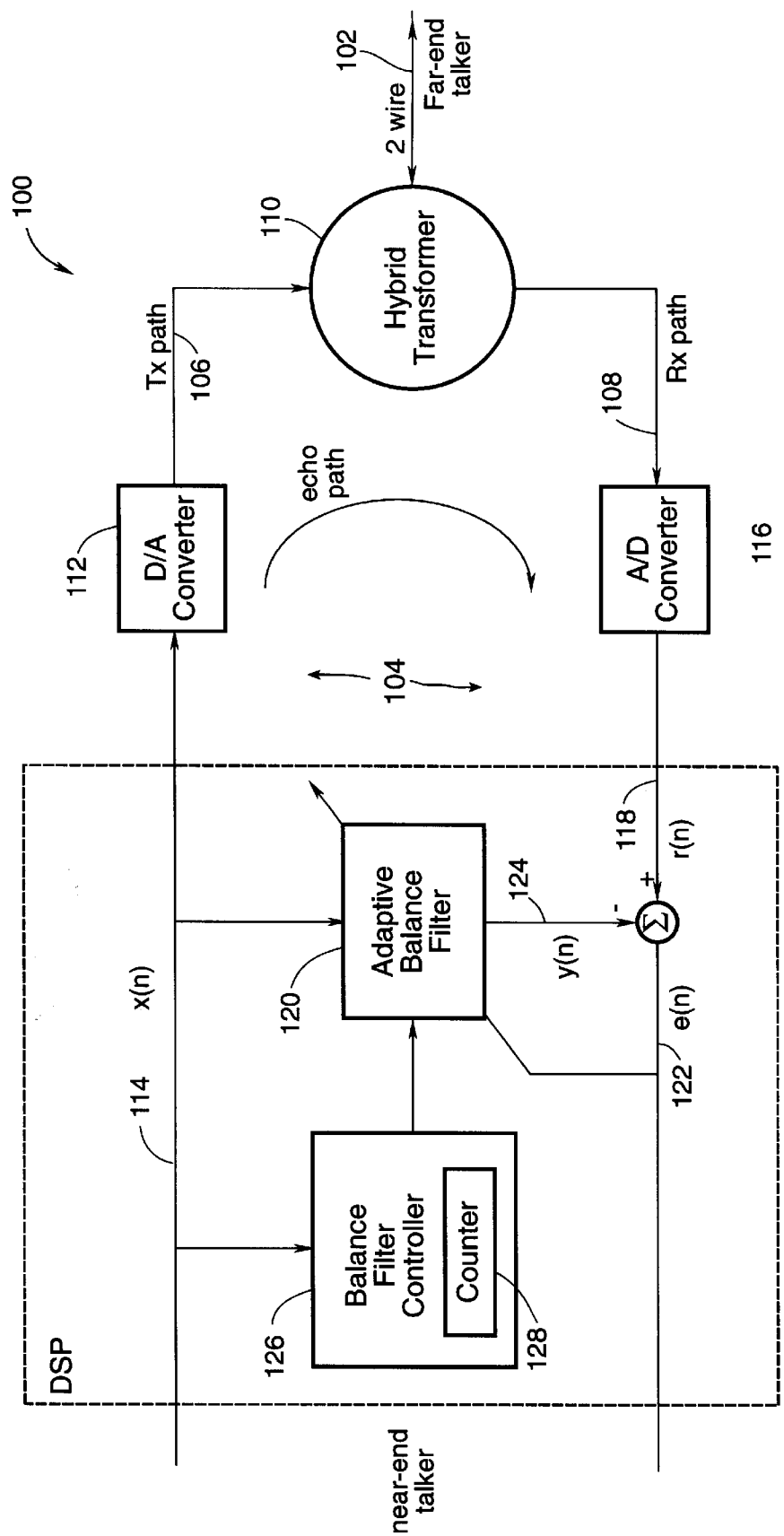
FIG. 1 is a block diagram of a communications network including two-wire and four-wire communication lines and a hybrid transformer and including an improved echo cancellation system according to the preferred embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to FIG. 1, a block diagram of the preferred embodiment of the present invention is shown. Communications network 100 includes two-wire bi-directional communication line 102 which is connected to a far-end talker or subscriber, typically a telephone set in a home or business. Communications network 100 further includes four-wire communication line 104 which is connected to a near-end talker, such as a telephone network central office. Four-wire communication line 104 includes transmit path 106 and receive path 108. Hybrid transformer 110 is coupled between two-wire communication line 102 and four-wire communication line 104 and converts the signals between the two-wire line 102 and four wire line 104. As shown, the hybrid transformer 110 is coupled to both the transmit path 106 and receive path 108 of four-wire line 104.

Communications network 100 further includes digital-to-analog (D/A) converter 112 coupled in transmit path 106 between the near-end talker and hybrid transformer 110. D/A converter 112 converts digital transmit path signal x(n) 114 from the near-end talker into its analog equivalent onto transmit path 106. Analog-to-digital converter 116 is coupled in receive path 108 between hybrid transformer 110 and the near end talker for converting a received signal from the two-wire line 102, i.e., from the far-end talker into its digital equivalent r(n) 118.

Filter 120 is coupled between transmit path 106 and receive path 108 of the four-wire line, preferably on the near-end talker side of D/A converter 112 and A/D converter 116. Filter 120, is preferably an adaptive balance filter. However, it is noted that the other types of filters may be used. Balance filter 120 receives transmit path signal 114 and error signal e(n) 122 and produces echo estimate signal y(n) 124 based on transmit path signal 114 and error signal 122. Error signal 122 is the difference between received signal 118 and echo estimate signal 124. Filter 120 employs a mixed mode least mean square (LMS) method to calculate its filter coefficients. In the preferred embodiment, filter 120 selects between a full LMS method using a first step size, a sign-sign LMS method using a second step size, and a full LMS method using a third step size. The filter intelligently selects between different filter, coefficient computation methods to achieve improved echo cancellation according to the present invention.

Balance filter controller 126 is coupled to the transmit path 106 and adaptive balance filter 120. The balance filter controller 126 receives transmit path signal 114 and directs the filter 120 to employ different coefficient computation methods. The balance filter controller 126 selects different coefficient controller methods as a function of the average power of transmit path signal 114 and as a function of the output of counter 128 in filter controller 126. It is noted that the balance filter controller 126 may use other criteria for selecting coefficient computation methods, as discussed.

In the preferred embodiment, filter 120 and filter controller 126 are implemented in software executing on a digital signal processor (DSP) including memory. It is noted that the filter 120 and filter controller 126 may also be implemented in software executed by a general purpose CPU, or may be implemented partially or completely in hardware or as hardwired logics.

Filter controller 126 calculates a power estimation of transmit path signal 114 based on the square of transmit path signal 114 using an auto-regressive filter. The power estimation is calculated according to the following equation:

$$P(n) = A \cdot P(n-1) + (1-A) \, x(n) \, x(n)$$

Filter 120 has an associated time constant and the constant A in the above equation depends on the time constant of filter 120. In the preferred embodiment, the constant A is 0.65. This value ensures that the filter 120 responds quickly to changes in transmit path signal 114. The power estimation is used by filter controller 126 to select the coefficient computation updated methods used by the filter 120 to calculate and/or update its filter coefficients.

Counter 128 is included in the preferred embodiment of the present invention to insure an acceptable initial convergence upon establishment of a new connection on the network. Counter 128 begins counting up from zero to a predetermined number T upon establishment of a new connection and remains at the predetermined number, T. During the time the counter 128 is counting up to T, the balance filter controller 126 directs the filter 120 to use a first coefficient calculation update method, preferably the full LMS method. In the preferred embodiment the predetermined number T is 9000. Counter 128 is reset to zero when a disconnection occurs to ensure that the next time a new connection is established, the counter 128 starts counting up from zero.

The following pseudo-code describes the method which filter controller 126 uses to select the filter coefficient update method or algorithm:

```
if ( counter < T ) {
    algorithm = full LMS using first step size
} else {
if ( P(n) > P_th1 ) {
    algorithm = full LMS using first step size
} else if ( P(n) < P_th2 ) ) {
    algorithm = full LMS using third step size
} else {
    algorithm = sign-sign LMS using second step size
}
}
```

P_th1 is an upper power limit and P_th2 is a lower power limit. In the preferred embodiment, P_th1 is much much greater than P_th2. In the preferred embodiment P_th1 is 40 dB greater than P_th2.

Turning now to FIG. 2, a state diagram illustrating the method for selecting different coefficient computation methods is shown. In the preferred embodiment, filter 120 (of FIG. 1) starts by selecting a full LMS method. Filter 120 selects a sign-sign LMS method if the output of counter 128 is greater than a predetermined value T and the average power of transmit path signal 114 is greater than the lower power limit, P_th2, and the average power of transmit path signal 114 is less than the upper power limit, P_th1. If filter 120 is selecting the sign-sign LMS method and the average power of transmit path signal 114 becomes less than the lower power limit, P_th2, or the average power of transmit path signal 114 becomes greater than the upper power limit, P_th1, filter 120 selects the full LMS method.

Turning now to FIG. 3, a flow diagram illustrating the method for selecting different coefficient computation methods is shown. In the preferred embodiment, in step 302 the filter 120 determines if the output of counter 128 is less than a predetermined value, T. If so, then in step 304 the filter 120 selects a full LMS method using a first step size. If the output of counter 128 is not less than a predetermined value in step 302, then in step 306 the filter 120 determines if the average power of transmit path signal 114 is greater than the upper power limit, P_th1. If so, then in step 304 the filter 120 selects the full LMS method using a first step size. If the average power of the transmit path signal 114 is not greater than the upper power limit P_th1 in step 306, then in step 308 the filter 120 determines if the average power of transmit path signal 114 is less than the lower power limit, P_th2. If so, then in step 310 the filter 120 selects a full LMS method using a third step size. If the average power of the transmit path signal 114 is not less than the lower power limit P_th2 in step 308, then in step 312 filter 120 selects a sign-sign LMS method using a second step size.

Returning now to FIG. 1, in the case where the full LMS algorithm using a first step size is selected, filter coefficients are calculated according to the following equation:

$$w_k(n+1)=w_k(n)+u1\ e(n)x(n-k),\ k=0,1,\ldots,N-1$$

In the case where the sign-sign algorithm using a second step size is selected, the filter coefficients are calculated using:

$$w_k(n+1)=w_k(n)+u2\,sign(e(n))sign(x(n-k)),\ k=0,1,\ldots,N-1$$

In the case where the full LMS algorithm using a third step size is selected filter coefficients are calculated according to the following equation:

$$w_k(n+1)=w_k(n)+u3\ e(n)x(n-k),\ k=0,1,\ldots,N-1$$

In the above equations n is a sample index, $w_k(\ )$ is a filter coefficient, u1 is the first step size, u2 is the second step size, u3 is the third step size, $e(\ )$ is error signal 122, $x(\ )$ is transmit path signal 114, k signifies one of the filter coefficients, N is the number of filter coefficients and sign( ) takes an algebraic sign of its argument.

When employing an LMS algorithm to calculate filter coefficients, the step size used is a crucial factor in determining the convergence speed and stability of the filter. If the step size is too large, the noise added into the operation will cause the adaptive algorithm to diverge. On the other hand, if the step size is too small, the filter 120 may take a long time to converge. When employing a fixed point implementation on the DSP, if the step size is too small, the balance filter coefficients will not be updated, and as a result the LMS algorithm never converges to the optimal state.

The step size of an LMS algorithm is upper bounded by the reciprocal of the largest eigenvalue of the transmit path signal correlation matrix. That is:

$$u < \frac{1}{\lambda_{max}} < \frac{1}{Tr[R]} = \frac{1}{\sum_{n=0}^{N-1} \lambda_n} = \frac{1}{N\sigma_x^2}$$

where R is the transmit path signal correlation matrix, Tr[R] is the trace of matrix R, $\lambda_n$ are the eigenvalues of the signal correlation matrix for the transmit path signal 114, N is the number of filter coefficients, and $\sigma_x^2$ is the average power of transmit path signal 114.

The step size also has a lower bound, determined by quantization of the update value of the filter coefficients. To ensure the filter coefficient values are updated, the update must be larger than the smallest quantization value of the update. The condition under which the ith coefficient of the balance filter stops updating is:

$$|u\ e(n)\ x(n-i)|<\delta/2$$

In the above equation u is the step size, $e(\ )$ is error signal 122, $x(\ )$ is transmit path signal 114 and $\delta$ is the increment between two consecutive legal quantizer output levels.

The step size u then has a lower bound:

$$u > u_{min} = \sqrt{\frac{\delta^2}{4\sigma_x^2\epsilon_{min}}}$$

where $\delta$ is the increment between two consecutive legal quantizer output levels, $\sigma_x^2$ is the average power of transmit path signal 114, and $\epsilon_{min}$ is the minimum power of error signal 122 at steady state, that is, at convergence.

In conclusion, the constraints upon the step size for an LMS algorithm to converge and remain stable, are according to the following inequality:

$$\sqrt{\frac{\delta^2}{4\sigma_x^2\epsilon_{min}}} < u < \frac{1}{N\sigma_x^2}$$

Another important property of an LMS algorithm is its convergence speed, t, which is inversely proportional to the step size u:

$$t = \frac{1}{u\lambda_{min}}$$

In the preferred embodiment of the present invention, different step sizes are employed in each usage of an LMS algorithm in order to achieve certain purposes. In the case where the full LMS algorithm using a first step size is employed, the first step size is chosen close to the upper bound to achieve quicker convergence at the expense of accuracy. In the preferred embodiment the first step size, u1=0.15. By way of example, assuming a mean transmit path signal power of 0.25, a 16 filter coefficient LMS algorithm will have upper bound for $$u < \frac{1}{N\sigma_x^2} = 0.25.$$

In the case where the sign-sign algorithm using a second step size is employed, a very small step size, preferably a step size of u2=0.0003, is used to achieve high accuracy. Because u2 is small, the adaptation process continues until it reaches optimal convergence.

When the average power $\sigma_x^2$ of transmit path signal 114 is very small, even a very small step size will generate significant noise. The noise is significant because the signal is low, hence the signal-to-noise ratio is also low. If this condition is encountered, the coefficient update algorithm selector, i.e., the filter controller 126, changes back to employing the full LMS using a very small step size u3. In the preferred embodiment of the invention u3=0.0003.

The results achieved using the present invention are superior to a filter which employs a pure sign-sign LMS algorithm in that it has a much quicker convergence speed. A filter according to the preferred embodiment of present invention achieves convergence in less than 100 milliseconds, in comparison with a convergence time of over 1 second for a sign-sign only algorithm with the same step size. The cancellation result of this mixed algorithm is also a few dB better than the sign-sign algorithm.

Compared with a pure full LMS algorithm, the mixed algorithm of the present invention also has much better stability and a better cancellation result. A detailed comparison of the performance of a pure sign-sign LMS algorithm, a pure full LMS algorithm and a mixed mode LMS algorithm according to the present invention is given in the table below.

| Input level | −54 dBm | −48 dBm | −42 dBm | −36 dBm | −30 dBm | −24 dBm | −18 dBm | −12 dBm | −6 dBm | 0 dBm | +6 dBm |
|---|---|---|---|---|---|---|---|---|---|---|---|
| sign-sign | 12.9 | 25.7 | 33.2 | 35.3 | 35.6 | 35.6 | 35.6 | 35.5 | 30.6 | 26.8 | 23.2 |
| full LMS | 0.0 | 0.0 | 0.01 | 0.18 | 1.52 | 6.19 | 13.6 | 22.8 | 28.6 | 23.1 | 14.5 |
| mixed LMS | 13.3 | 26.6 | 33.4 | 35.2 | 35.5 | 35.6 | 35.6 | 35.6 | 30.6 | 26.8 | 23.2 |

Another advantage of the present invention is its ability to handle a double talker situation described previously. Filter 120 reaches convergence quickly employing the full LMS algorithm using the large first step size. As convergence is being reached, filter 120 switches to employing the sign-sign LMS algorithm using the small second step size to achieve a more accurate convergence. At this convergence state, the echo is mostly canceled, and error signal 122 is mainly composed of the far-end signal. The sign of the error signal will be mainly determined by the sign of the far-end signal. Most normal speech has very little DC content, and therefore has a zero mean. That is:

$$\sum_{n=0}^{N} \frac{x(n)}{N} = 0,$$

Therefore $$\sum_{n=0}^{N} \text{sign}(x(n)) = 0$$

as well if N is relatively large compared with the frequency of x(n). The same is true for the sign of the error signal $$\sum_{n=0}^{N} \text{sign}(e(n)) = 0.$$

Because error signal e(n) 122 and transmit path signal x(n) 114 are not correlated, we have $$\sum_{n=0}^{N} u \, \text{sign}(e(n))\text{sign}(x(n)) = 0.$$

The result that the sign-sign LMS algorithm has a tendency to remain convergent even when a double talker situation occurs is advantageously employed by the present invention. This result is true provided the step size used in the sign-sign LMS algorithm is sufficiently small, which is the case of the present invention where u2 is small, to guarantee that the error of the filter coefficients is small enough to not cause divergence. This makes the mixed mode LMS algorithm of the present invention handle the double talker situation very well without adding the extra complexity and cost associated with prior art solutions. The traditional method for a full LMS algorithm to handle the double talker situation is to examine the cross-correlation between the transmit signal and the received signal, and stop or slow adaptation when a double talker situation occurs. The cross-correlator commonly used in prior art implementations has typically been relatively expensive and complex.

Various plots obtained from simulations performed on a system according to the preferred embodiment of the present invention will now be discussed. These plots illustrate how the present invention advantageously performs echo cancellation with improved double-talker handling.

Figure 4:
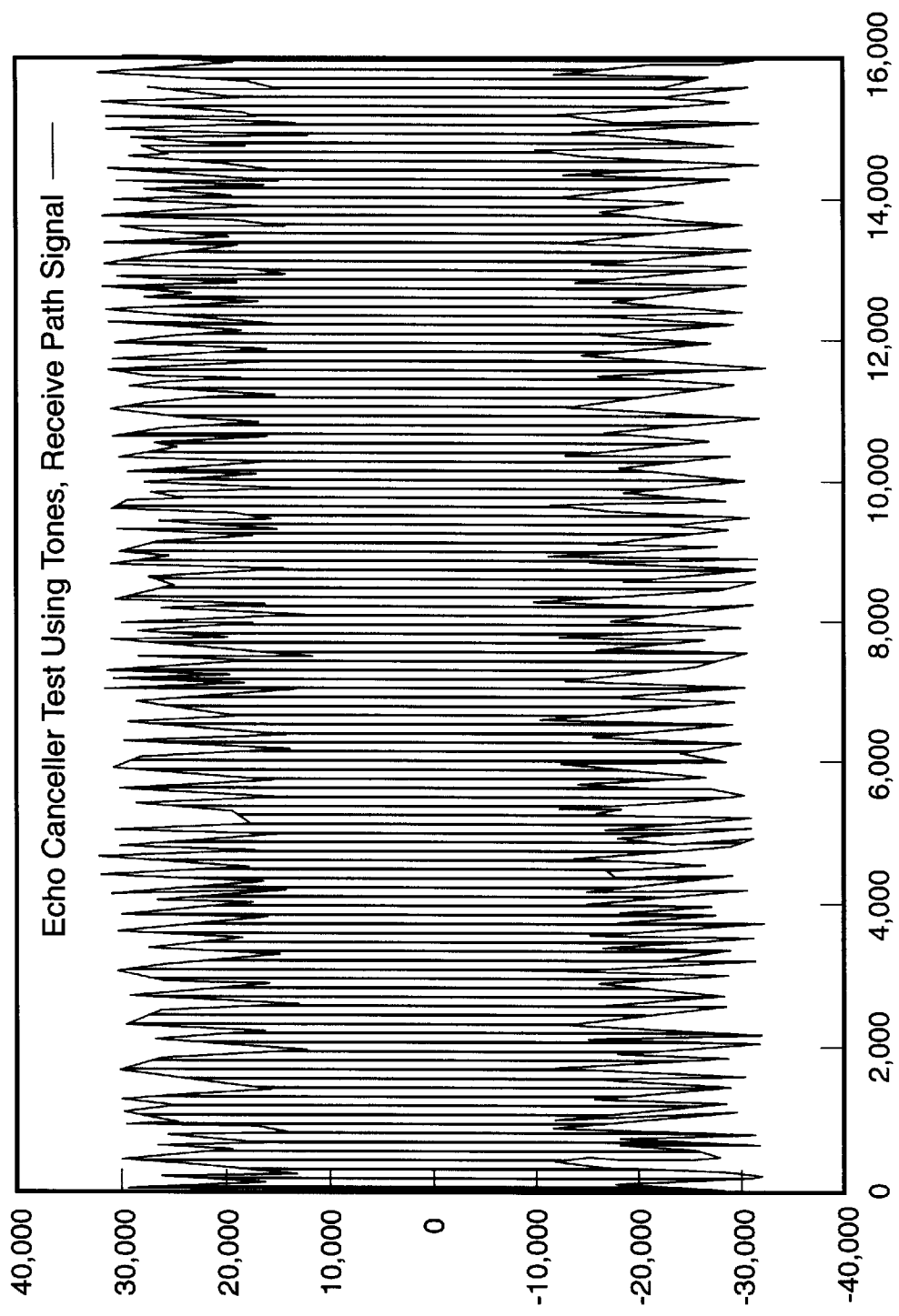
FIG. 4 is a time domain plot of the received signal when six tones are being transmitted from the near-end.

Turning now to FIG. 4, a time domain plot of received signal 118 (of FIG. 1) is shown. The x-axis is the sample count, or sample index. A sample is taken every 125 microseconds. The y-axis is the sample values of the voltage of received signal 118. Sample values are output from analog-to-digital converter 116. In the preferred embodiment analog-to-digital converter 116 is a 16-bit analog-to-digital converter, hence output values range between plus and minus 32767. Six tones of frequency 500 Hz, 712 Hz, 925 Hz, 1300 Hz, 1800 Hz, and 2500 Hz are being transmitted from the near-end. Since there is no far end component in this case, the received signal essentially constitutes the echo.

Figure 5:
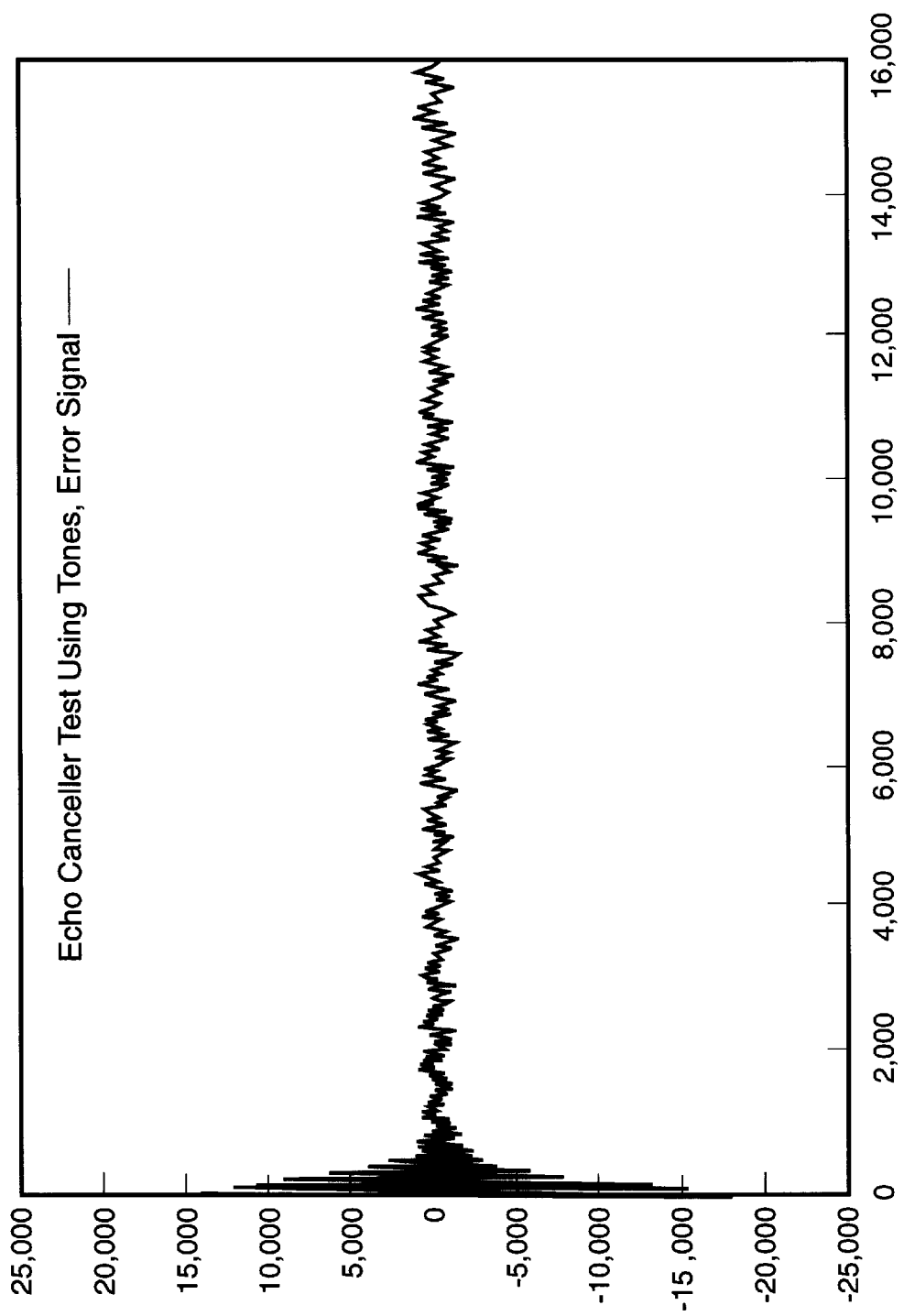
FIG. 5 is a time domain plot of the error signal associated with FIG. 4.

Turning now to FIG. 5, a time domain plot of error signal 122 (of FIG. 1) associated with the received signal of FIG. 4 is shown. One can readily observe the process of convergence in this plot. The amplitude of error signal 122 gets smaller and smaller until convergence at about sample 500.

Figure 6:
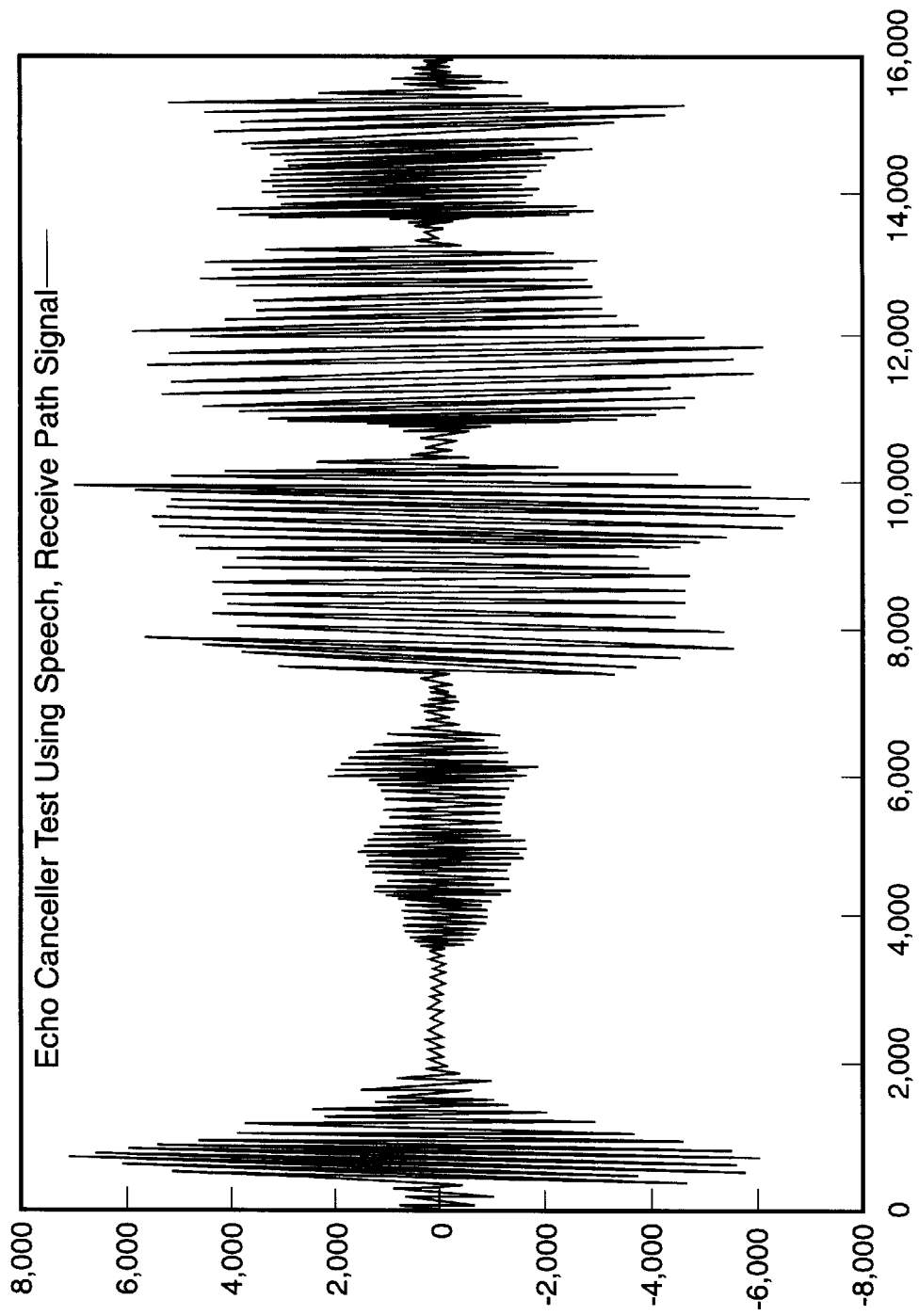
FIG. 6 is a time domain plot of the received signal when human speech is being transmitted from the near-end.

Turning now to FIG. 6, a time domain plot similar to that of FIG. 4 is shown, except that speech, rather than tones, are being transmitted from the near-end.

Figure 7:
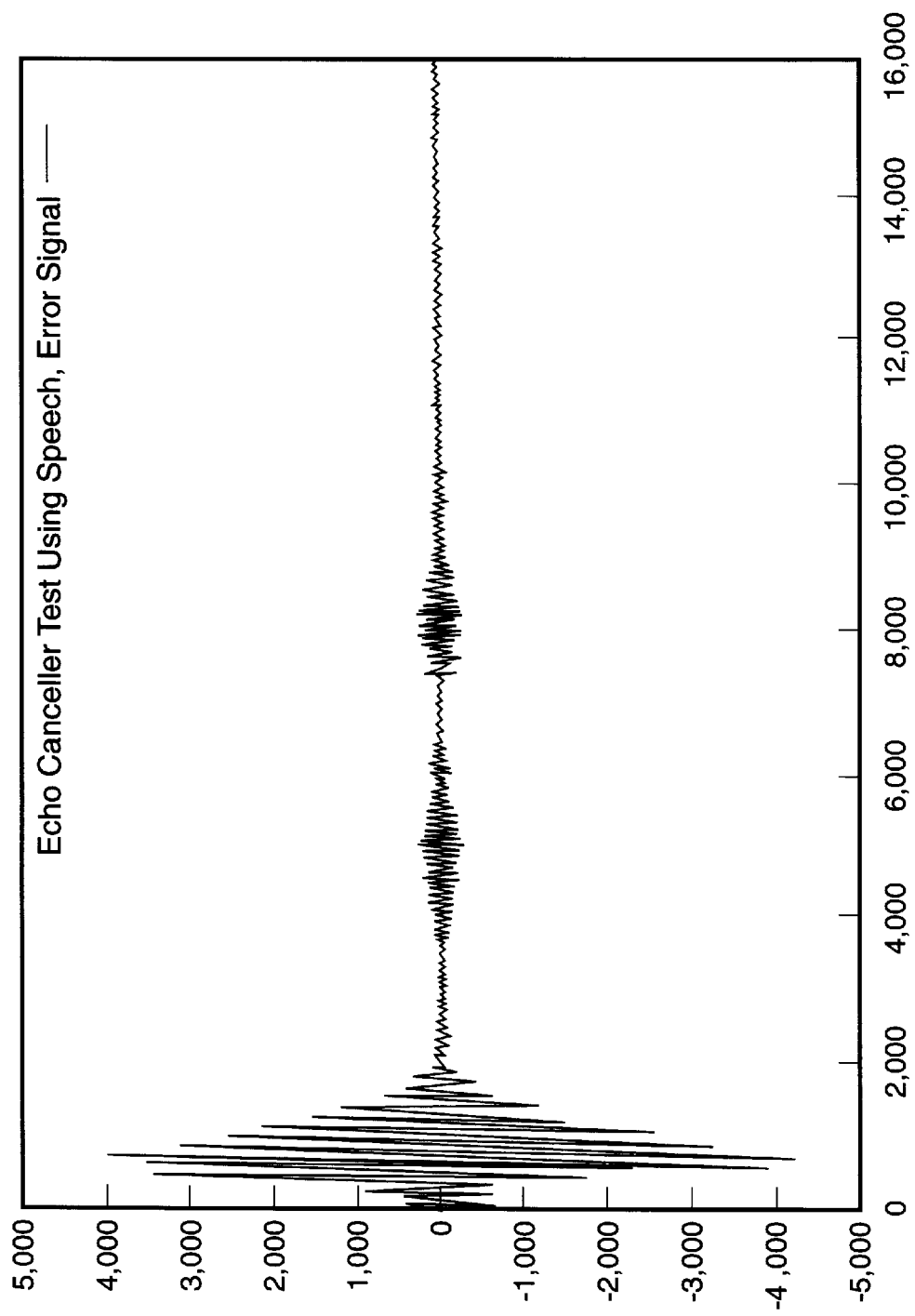
FIG. 7 is a time domain plot of the error signal associated with FIG. 6.

Turning now to FIG. 7, a time domain plot of error signal 122 associated with the received signal of FIG. 6 is shown. One can readily observe the process of convergence in this plot. Also it is noted how after convergence filter 120 (of FIG. 1) remains at a stable state.

Figure 8:
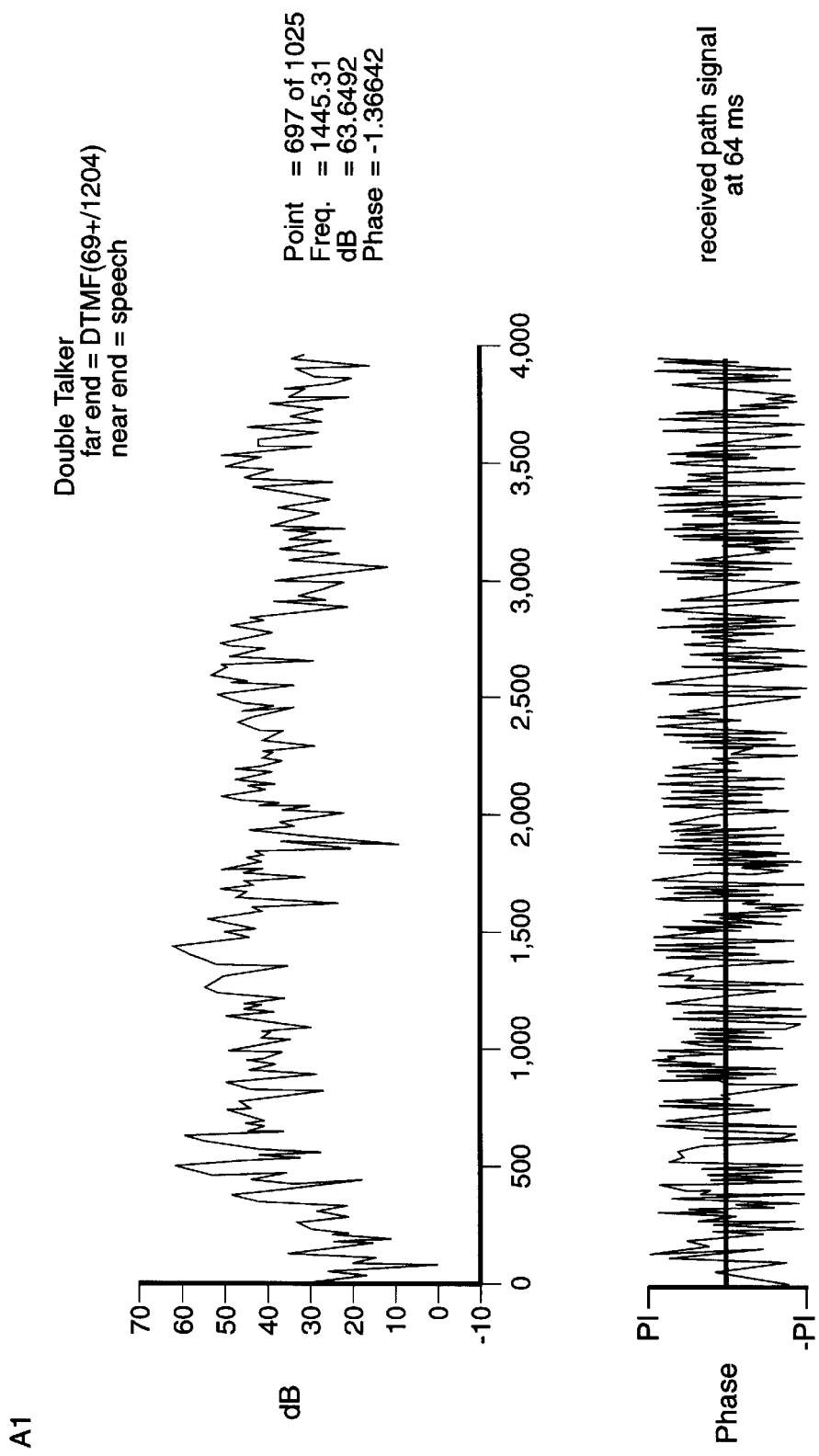
FIG. 8 is a frequency domain plot of the received signal taken at 64 milliseconds after the connection is established in a double-talker situation where two tones are being transmitted from the far-end and speech is transmitted from the near end.

Turning now to FIG. 8, a frequency domain plot of received signal 118 is shown. The x-axis the frequency. The y-axis is the amplitude, in dB, of received signal 122 at the given frequency taken at 64 milliseconds after the connection is established in a double-talker situation where a 697 Hz and 1209 Hz tone are being transmitted from the far-end and speech is transmitted from the near end. The playback of an answering machine message is representative of the near end speech.

Figure 9:
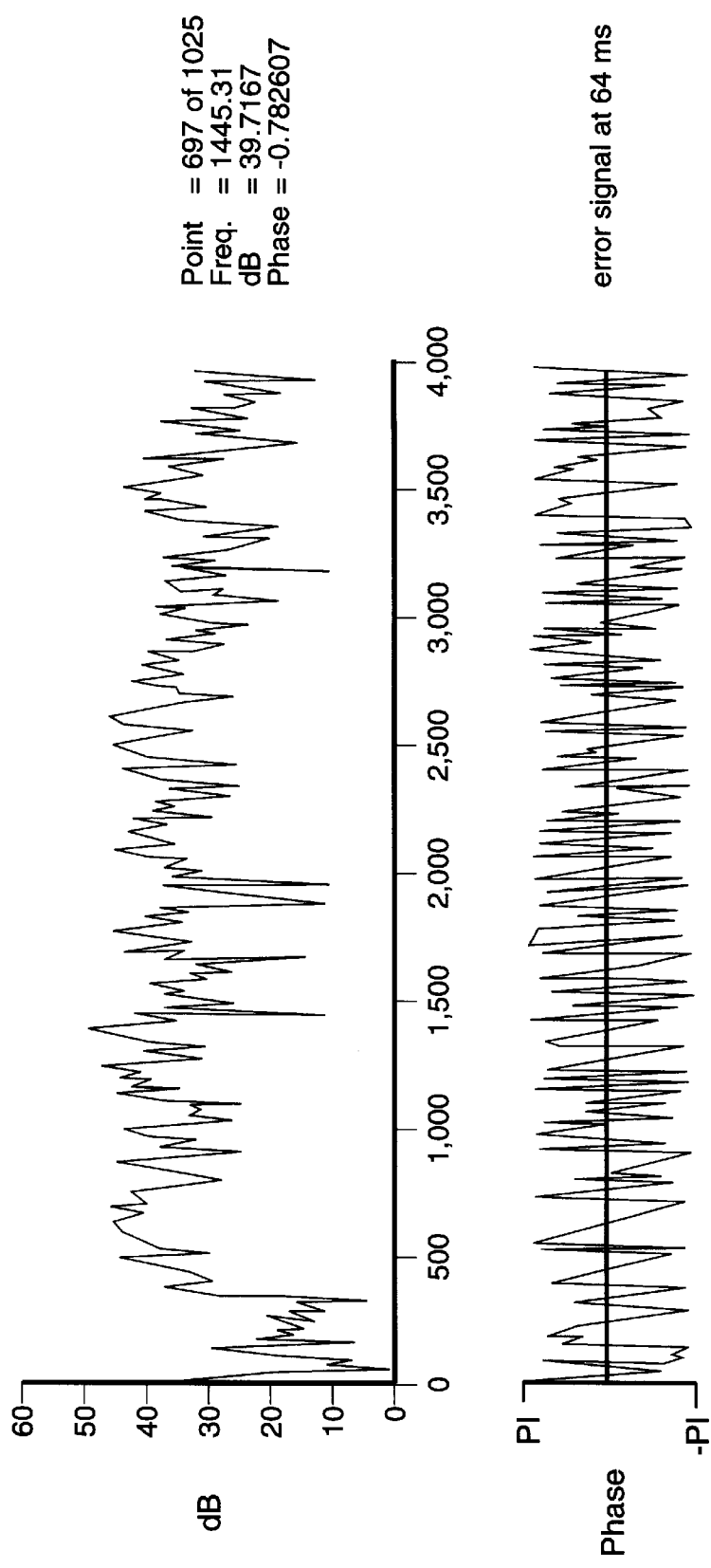
FIG. 9 is a frequency domain plot of the error signal associated with FIG. 8.

Turning now to FIG. 9, a frequency domain plot of error signal 122 associated with the received signal of FIG. 8 is shown. Since the filter has not yet converged, the DTMF signal cannot be seen in the error signal plot.

Figure 10:
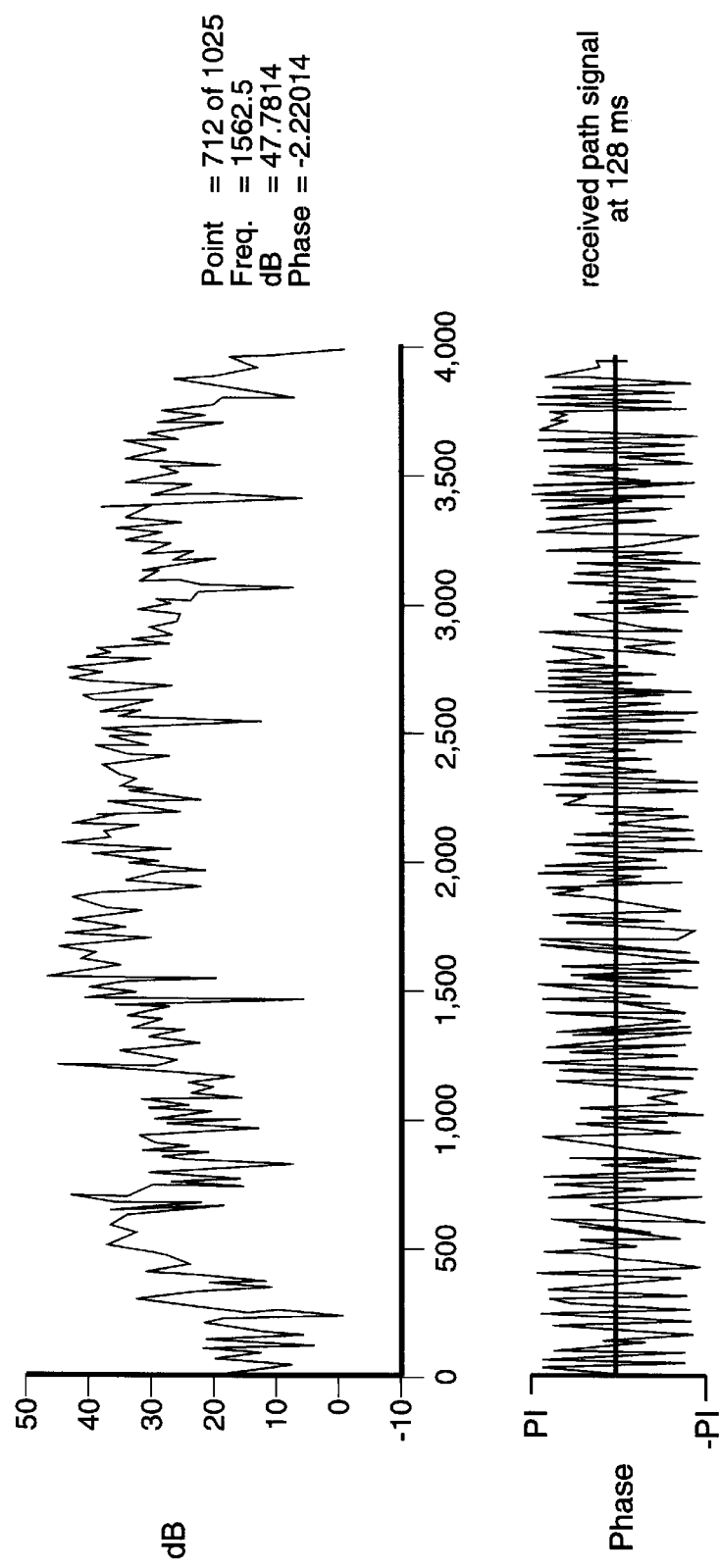
FIG. 10 is a frequency domain plot of the received signal taken at 128 milliseconds after the connection is established in a double-talker situation where two tones are being transmitted from the far-end and speech is transmitted from the near end.

Turning now to FIG. 10, a frequency domain plot similar to that of FIG. 8, but taken at 128 milliseconds after the connection is established, is shown.

Figure 11:
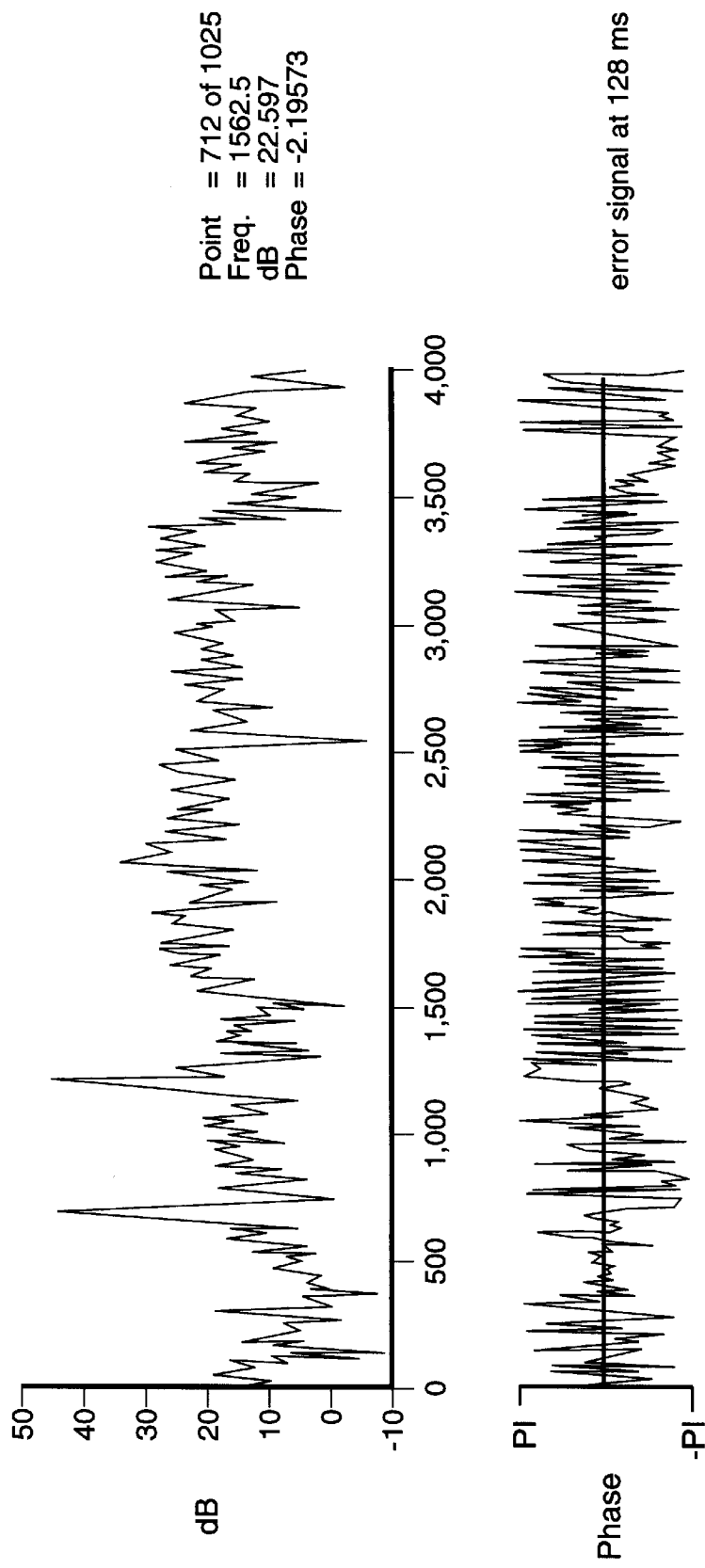
FIG. 11 is a frequency domain plot of the error signal associated with FIG. 9.

Turning now to FIG. 11, a frequency domain plot similar to that of FIG. 9, but taken at 128 milliseconds after the connection is established, is shown. In this case filter 120 has converged and the speech component of the received signal, that is the echo, has effectively been canceled. As a result, the DTMF can be seen in the error signal.

Figure 12:
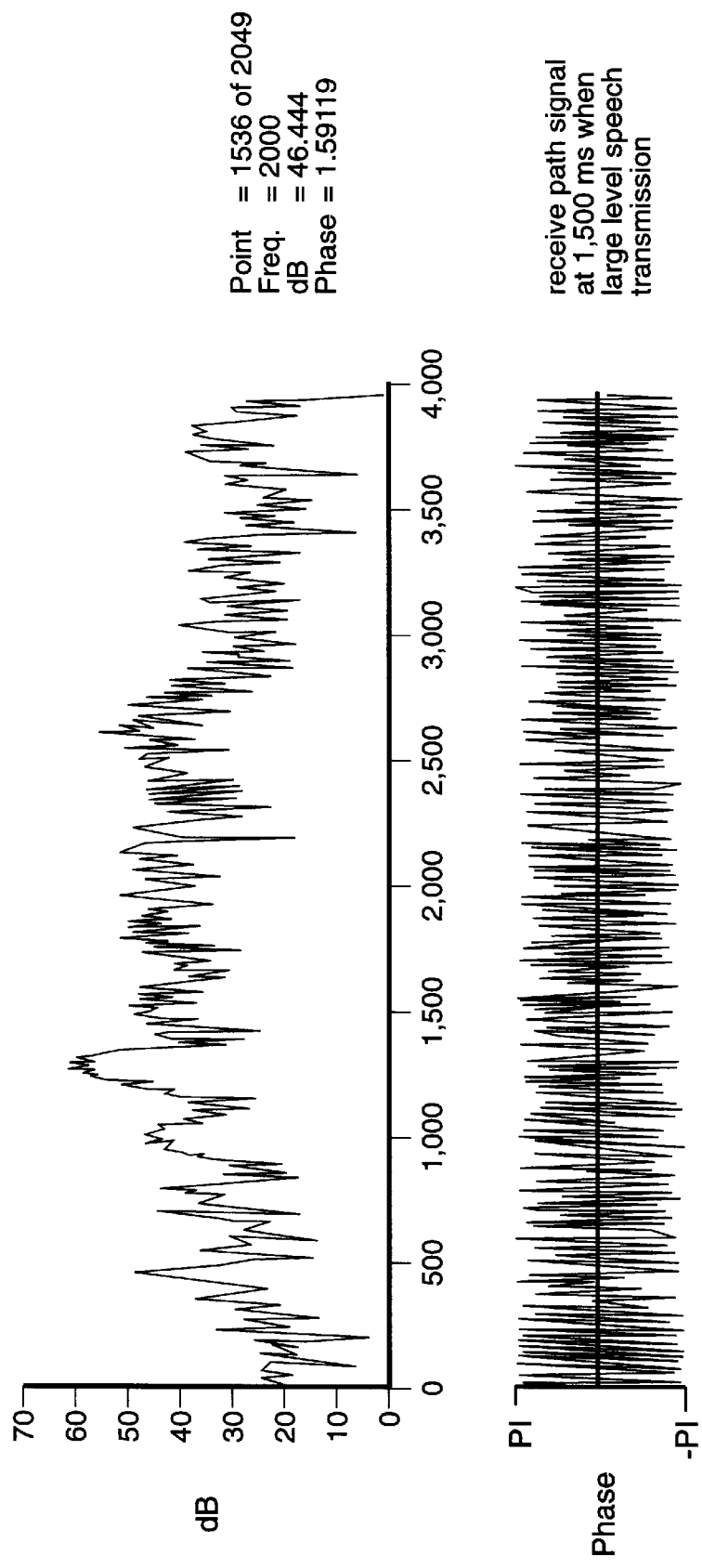
FIG. 12 is a frequency domain plot of the received signal taken at 1500 milliseconds after the connection is established in a double-talker situation where two tones are being transmitted from the far-end and speech is transmitted from the near end.

Turning now to FIG. 12, a frequency domain plot similar to that of FIG. 10, but taken at 1500 milliseconds after the connection is established, is shown.

Figure 13:
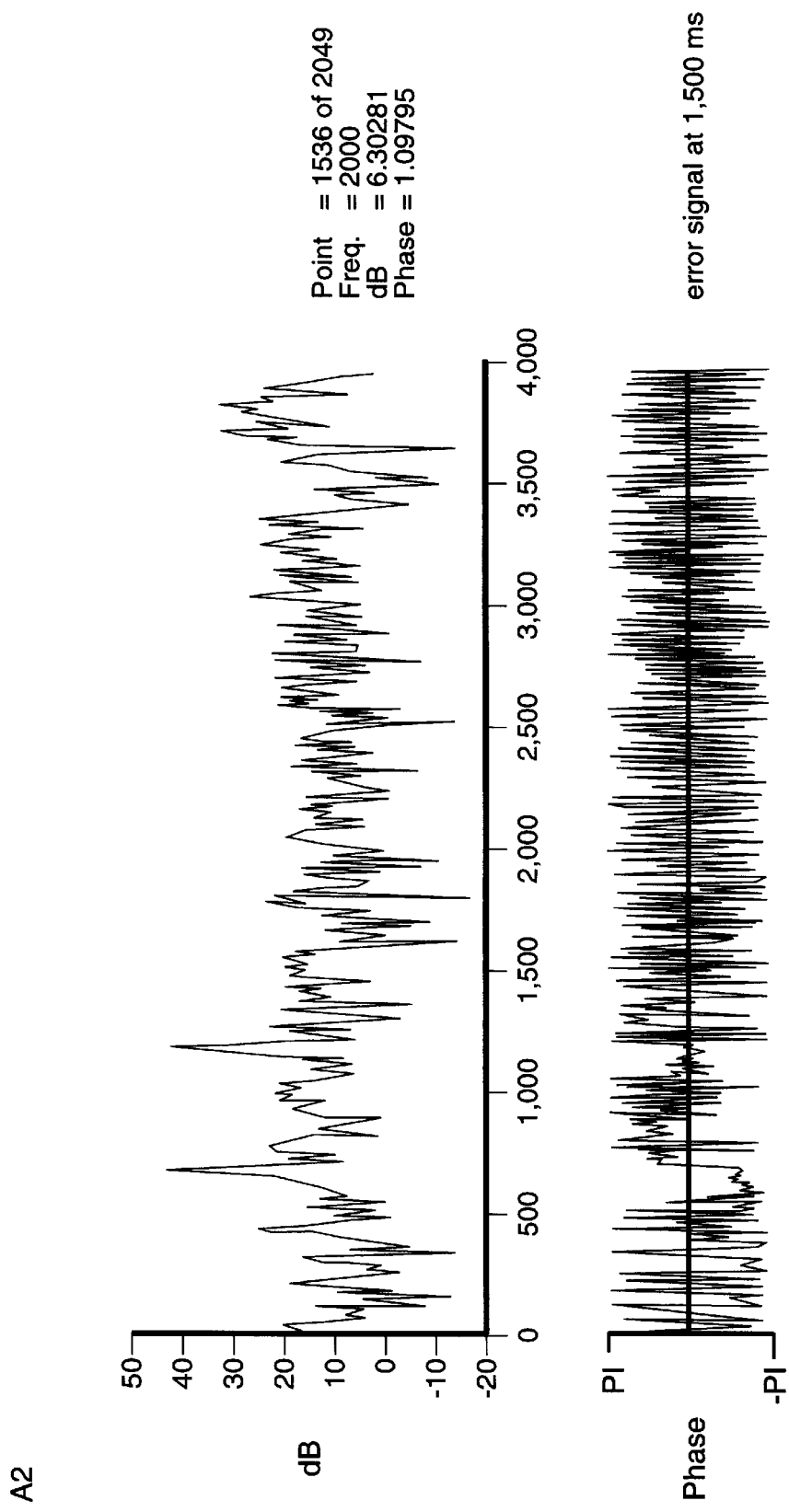
FIG. 13 is a frequency domain plot of the error signal associated with FIG. 11.

Turning now to FIG. 13, a frequency domain plot similar to that of FIG. 11, but taken at 1500 milliseconds after the connection is established, is shown. This plot illustrates how filter 120 continues to remain converged even when later in time the speech transmit signal level increases (therefore the echo increases) and the DTMF can still be seen. It is noted that the speech level, centered roughly around 1300 Hz, in received signal 118 (of FIG. 10) are even higher than the DTMF signal level, but the cancellation results are so good that the DTMF (which is the far-end and remain untouched) "emerged" from the speech.

Figure 14:
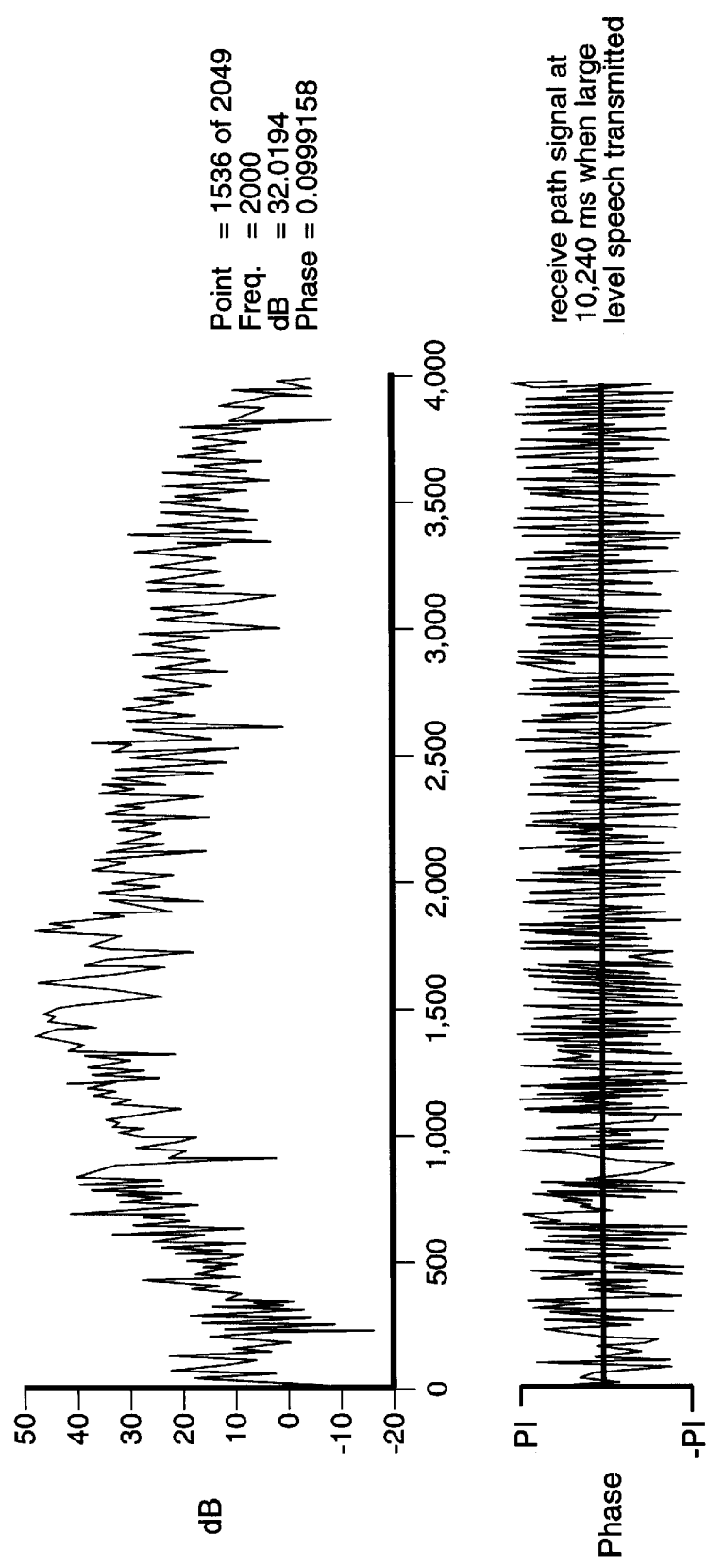
FIG. 14 is a frequency domain plot of the received signal taken at 10240 milliseconds after the connection is established in a double-talker situation where two tones are being transmitted from the far-end and speech is transmitted from the near end.

Turning now to FIG. 14, a frequency domain plot similar to that of FIG. 12, but taken at 10240 milliseconds after the connection is established, is shown.

Figure 15:
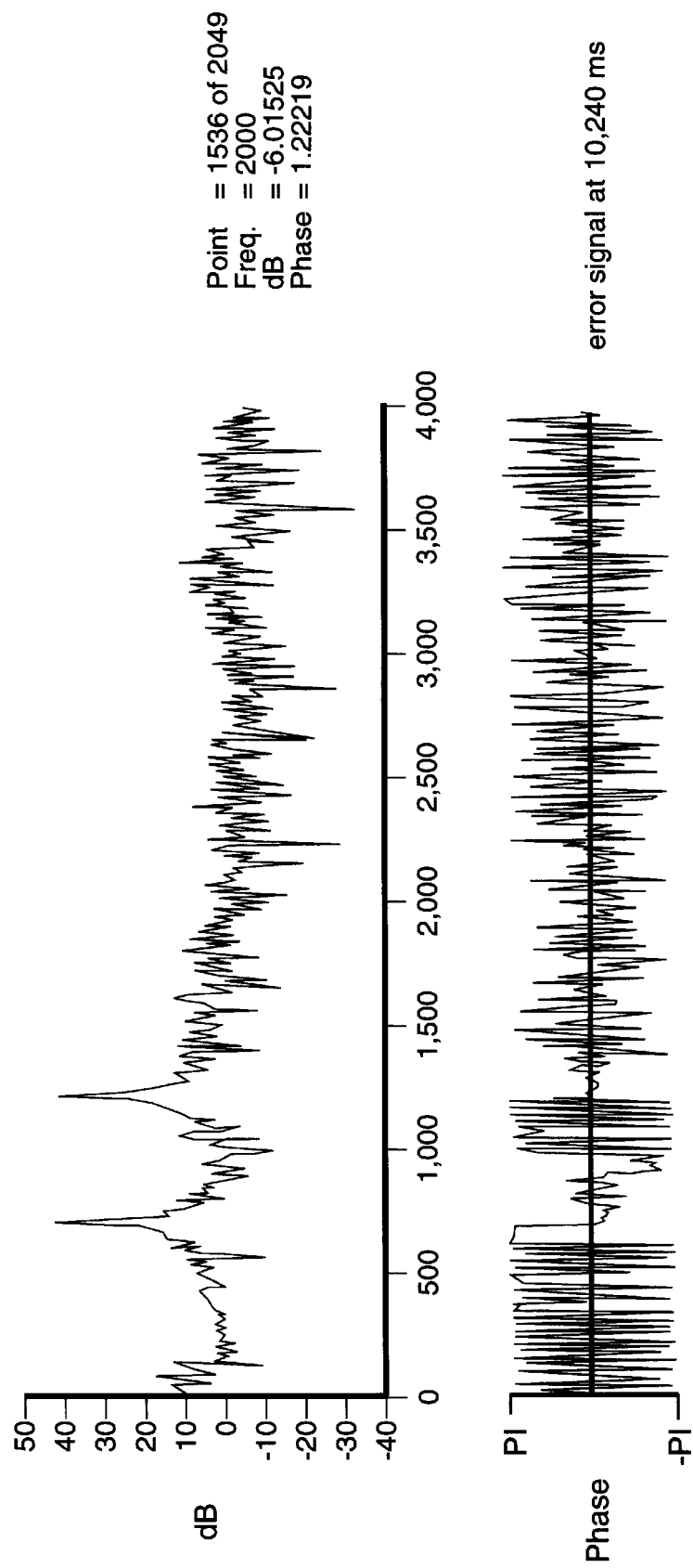
FIG. 15 is a frequency domain plot of the error signal associated with FIG. 13.

Turning now to FIG. 15, a frequency domain plot similar to that of FIG. 13, but taken at 10240 milliseconds after the connection is established, is shown. This plot illustrates properties of filter 120 similar to that of FIG. 13.

It is noted that there are many other cases where echo cancellation is essential and where the present invention performs such echo cancellation in a manner superior to prior art echo cancellers.

Numerous variations and modifications will become apparent to those skilled in the art once the above disclosure is fully appreciated. It is intended that the following claims be interpreted to embrace all such variations and modifications.

What is claimed is:

1. A system for performing echo cancellation in a communications network, comprising:

a bi-directional two-wire communication line;

a four-wire communication line having a transmit path and a receive path, wherein said transmit path is adapted to transfer a transmit path signal and said receive path is adapted to receive a received signal;

a hybrid transformer coupled between said two-wire communication line and said four-wire communication line which performs two-wire to four-wire circuit conversion on signals transmitted between said two-wire line and said four-wire line, wherein said transmit path signal is provided on said transmit path of said four-wire communication line to said two-wire communication line, wherein an echo component is reflected from said hybrid transformer to said receive path of said four-wire communication line; and a filter coupled to said receive path for reducing said echo component on said receive path, wherein said filter uses a number of filter coefficients, wherein said filter selectively employs a first coefficient calculation technique to compute said filter coefficients during a first period of time to achieve quick convergence, and wherein said filter selectively employs a second coefficient calculation technique to compute said filter coefficients during a second period of time to achieve improved stability and convergence.

2. The system of claim 1, wherein said filter generates an echo estimate signal on said receive path to reduce said echo component on said receive path.

3. The system of claim 2, wherein said filter is also coupled to said transmit path, wherein said filter receives said transmit path signal and an error signal and generates said echo estimate signal as a function of said transmit path signal and said error signal, wherein said error signal is a prior echo estimate signal subtracted from said received signal.

4. The system of claim 1, wherein said first and second coefficient calculation techniques are selected according to a power estimation of said transmit path signal.

5. The system of claim 1, further comprising:

a filter controller coupled to said filter for directing said filter to use either said first coefficient calculation technique or said second coefficient calculation technique to compute said filter coefficient values.

6. The system of claim 5, wherein said filter controller is coupled to said transmit path and computes a power estimation of said transmit path signal;

wherein said filter controller selects said first coefficient calculation technique when said power estimation is greater than an upper power threshold, wherein said filter controller selects said second coefficient calculation technique when said power estimation is between said upper power threshold and a lower power threshold, wherein said filter controller selects a third coefficient calculation technique when said power estimation is less than said lower power threshold.

7. The system of claim 6, wherein said power estimation is calculated according to an equation $$P(n)=A*P(n-1)+(1-A)x(n)x(n)$$

wherein P( ) is said power estimation, wherein said filter has an associated time constant and wherein A is a constant dependent upon said time constant of said filter, wherein x( ) is said transmit path signal, wherein n is a sample index.

8. The system of claim 5, wherein said filter controller further includes a counter which begins counting upon establishment of a new communication connection, wherein said filter controller selects said first coefficient calculation technique when said counter has a value less than a predetermined value.

9. The system of claim 8, wherein said counter begins counting from zero;

wherein said counter is reset to zero upon a communication disconnection.

10. The system of claim 5, wherein said filter controller is coupled to said transmit path and computes a power estimation of said transmit path signal;

wherein said filter controller selects said first coefficient calculation technique when said power estimation is greater than a predetermined power threshold, wherein said filter controller selects said second coefficient calculation technique when said power estimation is less than said power threshold.

11. The system of claim 10, wherein said first and second coefficient calculation techniques employ first and second step sizes, respectively, wherein said first step size is large relative to said second step size, wherein said second step size is small relative to said first step size.

12. The system of claim 11, wherein said first step size is inversely proportional to said power threshold.

13. The system of claim 1, wherein said first coefficient calculation technique is a full Least Mean Square (LMS) technique with a first step size, and wherein said second coefficient calculation technique is a sign-sign LMS technique with a second step size, wherein said first step size is greater than said second step size.

14. The system of claim 13, wherein said filter controller is coupled to said transmit path and computes a power estimation of said transmit path signal;

wherein said filter controller selects said full LMS technique with said first step size when said power estimation is greater than an upper power threshold, wherein said filter controller selects said sign-sign LMS technique using said second step size when said power estimation is between said upper power threshold and a lower power threshold, wherein said filter controller selects said full LMS technique using a third step size when said power estimation is less than said lower power threshold, wherein said upper power threshold is greater than said lower power threshold.

15. The system of claim 14, wherein said first step size approximates and is less than an upper bound according to an inequality $$u1 < \frac{1}{N\sigma_x^2}$$

wherein $\sigma_x^2$ is an average power of said transmit path signal, wherein N is the number of filter coefficients.

16. The system of claim 14, wherein said second step size approximates and is greater than a lower bound according to an inequality $$u2 > \sqrt{\frac{\delta^2}{4\sigma_x^2 \epsilon_{min}}}$$

wherein $\sigma_x^2$ is an average power of said transmit path signal, wherein $\delta$ is an increment between two consecutive legal quantizer output levels of said analog-to-digital converter, wherein $\epsilon_{min}$ is a minimum power of said error signal at convergence.

17. The system of claim 14, wherein said first step size is approximately 0.15, said second step size is approximately 0.0003, and said third step size is approximately 0.0003.

18. The system of claim 1, wherein said filter comprises a digital signal processor configured to perform filtering functions; the system further comprising:
a digital-to-analog converter coupled in said transmit path between said hybrid transformer and said filter; and
an analog-to-digital converter coupled in said receive path between said hybrid transformer and said filter.

19. The system of claim 1, wherein said first coefficient calculation technique comprises a first Least Mean Square (LMS) technique and said second coefficient calculation technique comprises a second LMS technique, wherein said first and second LMS techniques are different.

20. The system of claim 1, wherein said first and second coefficient calculation techniques employ first and second step sizes, respectively, wherein said first step size is large relative to said second step size to achieve quick convergence, wherein said second step size is small relative to said first step size to achieve improved stability.

21. The system of claim 1, wherein said second coefficient calculation technique comprises a coefficient calculation technique which tends to remain convergent in a double-talker situation.

22. The system of claim 21, wherein said second coefficient calculation technique comprises a sign-sign LMS coefficient calculation technique.

23. A method for performing echo cancellation in a communications network having a bi-directional two-wire line, a four-wire line having a transmit path and a receive path, a hybrid transformer coupled between said two-wire line and said four-wire line, and a filter coupled to said receive path having a number of filter coefficients, the method comprising:
transmitting a transmit path signal on said transmit path of said four-wire line;
said hybrid transformer performing two-wire to four-wire circuit conversion on said transmit path signal;
an echo component reflecting from said hybrid transformer to said receive path of said four-wire communication line;
filtering said receive path to reduce said echo component on said receive path, wherein said filtering uses a number of filter coefficients, wherein said filtering selectively employs a first coefficient calculation technique to compute said filter coefficients during a first period of time to achieve quick convergence, and wherein said filtering selectively employs a second coefficient calculation technique to compute said filter coefficients during a second period of time to achieve improved stability and convergence.

24. The method of claim 23, wherein said filtering comprises:
generating an echo estimate signal, wherein said echo estimate signal reduces said echo component.

25. The method of claim 24, wherein said filtering comprises:
receiving said transmit path signal and an error signal, wherein said generating said echo estimate signal is a function of said transmit path signal and said error signal;
subtracting said echo estimate signal from said received signal resulting in said error signal.

26. The method of claim 23, wherein said filtering comprises:
computing said filter coefficient values according to a power estimation of said transmit path signal.

27. The method of claim 23, wherein said filtering comprises:
a filter controller directing said filter to use either said first coefficient calculation technique or said second coefficient calculation technique to compute said filter coefficient values.

28. The method of claim 23, wherein said filtering comprises:
computing a power estimation of said transmit path signal.

29. The method of claim 28, wherein said generating said power estimation is performed according to an equation $$P(n)=A*P(n-1)+(1-A)x(n)x(n)$$

wherein P( ) is said power estimation, wherein said filter has an associated time constant and wherein A is a constant dependent upon said time constant of said filter, wherein x( ) is said transmit signal, wherein n is a sample index.

30. The method of claim 28, wherein said filtering comprises:
selecting said first coefficient calculation technique when said power estimation is greater than an upper power threshold;
selecting said second coefficient calculation technique when said power estimation is between said upper power threshold and a lower power threshold;
selecting a third coefficient calculation technique when said power estimation is less than said lower power threshold.

31. The method of claim 30, wherein said selecting said first coefficient calculation technique comprises selecting a full Least Mean Square (LMS) technique with a first step size, and wherein said selecting second coefficient calculation technique comprises selecting a sign-sign LMS technique with a second step size, wherein said selecting said third coefficient calculation technique comprises selecting a full LMS technique with a third step size, wherein said first step size is substantially greater than said second step size and said first step size is substantially greater than said third step size.

32. The method of claim 31, wherein said filtering comprises:
computing a power estimation of said transmit path signal;

selecting said full LMS technique with said first step size when said power estimation is greater than an upper power threshold;

selecting said sign-sign LMS technique using said second step size when said power estimation is between said upper power threshold and a lower power threshold;

selecting said full LMS technique using a third step size when said power estimation is less than said lower power threshold, wherein said upper power threshold is greater than said lower power threshold.

33. The method of claim 23, wherein said filtering comprises:

beginning counting upon establishment of a new communication connection;

selecting said first coefficient calculation technique when said counting has not reached a predetermined value.

34. The method of claim 33, wherein said filter includes a counter which performs said counting, wherein said beginning counting begins from zero and wherein said filtering comprises:

resetting said counter to zero upon a communication disconnection.

35. A system for performing echo cancellation in a communications network, comprising:

a first communication line;

a second communication line having a transmit path and a receive path, wherein said transmit path is adapted to transfer a transmit path signal and said receive path is adapted to receive a received signal;

a hybrid transformer coupled between said first communication line and said second communication line which converts signals transmitted between said first communication line and said second communication line, wherein said transmit path signal is provided on said transmit path of said second communication line to said first communication line, wherein an echo component is reflected from said hybrid transformer to said receive path of said second communication line; and a filter coupled to said receive path for reducing said echo component on said receive path, wherein said filter uses a number of filter coefficients, wherein said filter selectively employs a first coefficient calculation technique to compute said filter coefficients during a first period of time, and wherein said filter selectively employs a second coefficient calculation technique to compute said filter coefficients during a second period of time.

* * * * *